(12) United States Patent
Sohi et al.

(10) Patent No.: US 12,517,838 B2
(45) Date of Patent: Jan. 6, 2026

(54) COMPUTER ARCHITECTURE USING PROGRAM COUNTER INDEXED DATA ADDRESS TRANSLATION

(71) Applicant: Wisconsin Alumni Research Foundation, Madison, WI (US)

(72) Inventors: Gurindar Sohi, Madison, WI (US); Shyam Murthy, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 97 days.

(21) Appl. No.: 18/633,700

(22) Filed: Apr. 12, 2024

(65) Prior Publication Data

US 2025/0321897 A1 Oct. 16, 2025

(51) Int. Cl.
*G06F 12/1027* (2016.01)
*G06F 9/32* (2018.01)
*G06F 12/0891* (2016.01)

(52) U.S. Cl.
CPC .......... *G06F 12/1027* (2013.01); *G06F 9/321* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 5,509,137 A * | 4/1996 | Itomitsu | G06F 12/0855 |
| | | | 711/146 |
| 2007/0106874 A1* | 5/2007 | Pan | G06F 12/10 |
| | | | 711/E12.066 |
| 2018/0232233 A1* | 8/2018 | Wright | G06F 9/3806 |
| 2020/0293457 A1 | 9/2020 | Vougioukas et al. | |
| 2021/0373889 A1 | 12/2021 | Cai et al. | |
| 2023/0089349 A1* | 3/2023 | Sohi | G06F 9/35 |
| | | | 712/225 |

FOREIGN PATENT DOCUMENTS

WO 2016171866 A1 10/2016

OTHER PUBLICATIONS

Gokul B. Kandiraju et al.; "Going the distance for TLB prefetching: An application-driven study." ACM SIGARCH Computer Architecture News 30, No. 2 (2002): pp. 195-206. US.
Georgios Vavouliotis et al.; "Exploiting p. table locality for agile tlb prefetching." In 2021 ACM/IEEE 48th Annual International Symposium on Computer Architecture (ISCA), pp. 85-98. IEEE, 2021.
Mahadev Satyanarayanan et al.; "Design trade-offs in VAX-11 translation buffer organization." Computer 14, No. 12 (1981): pp. 103-111.
Santosh G. Abraham et al.; "Predictability of load/store instruction latencies." In Proceedings of the 26th annual international symposium on Microarchitecture, pp. 139-152. IEEE, 1993.
International Search Report for PCT/US2025/024012 dated Jul. 18, 2025.

* cited by examiner

*Primary Examiner* — Stephanie Wu
(74) *Attorney, Agent, or Firm* — Boyle Fredrickson, S.C.

(57) ABSTRACT

Translation between virtual memory addresses and physical memory addresses is mediated by a program counter indexed table holding virtual and corresponding physical addresses. In some embodiments, this table can be accessed early in the fetch cycle and avoid likely TLB misses.

20 Claims, 3 Drawing Sheets

COMPUTER ARCHITECTURE USING PROGRAM COUNTER INDEXED DATA ADDRESS TRANSLATION

BACKGROUND

The present invention relates to computer architectures employing page tables for the translation of a virtual memory address to a physical memory address.

Computer memory can be used to store electronic representations of data at physical memory addresses intrinsic to the location of the data. When a program executing on a computer needs to read instructions or data, it computes and provides to the memory system the physical memory address of the needed data. The memory uses this physical memory address to electrically connect to the proper memory location for reading or writing.

Computer systems typically operate with a "virtual" memory address paired with a corresponding physical memory address by an address translation system. This use of virtual memory addresses has several advantages. First, it simplifies the address space by providing identical apparently contiguous blocks of addresses for a program. Virtual memory addresses also operate to prevent interference between different programs that might overwrite each other's data, segregating each program within a different virtual memory address space. Importantly, virtual memory addresses also allow the individual programs to execute as if they have more memory than is actually physically available by multiplexing physical memory addresses among multiple virtual memory addresses at different times.

The necessary translation between a virtual memory address and a physical memory address may be accomplished by a page table (PT), an entry in the page table holding a corresponding physical memory address for a given virtual memory address. To translate a given virtual memory address to a physical memory address, the page table is typically accessed with the given virtual memory address to obtain the corresponding physical memory address. This translation step can consume substantial memory resources (for holding the translation information) and can slow the speed of execution of a program by the time required to complete the translation. For this reason it is known to use a "translation lookaside buffer" (TLB) that caches recently used translation pairs of virtual and physical memory addresses. When it is necessary to translate a virtual memory address to a physical memory address, the TLB is first accessed and, if there is a miss, meaning that the TLB does not hold the desired translation from a virtual memory address to a physical memory address, the PT may be consulted in a so-called PT walk.

SUMMARY

The present inventors have determined that: (1) a relatively small number of instructions statically identified by their program counter (PC) values are responsible for a disproportionate number of misses in a TLB, and (2) dynamic instances of these instructions frequently access the same page table entry. Accordingly, a relatively small table indexed with the PC value of an instruction, and holding page table entry information (pairs of virtual and physical memory addresses) can be used to provide an address translation for the data that the instruction is accessing, producing an acceleration in translation time and also providing energy savings.

More specifically, in one embodiment, the invention may provide an improved computer architecture of a type having a program counter (PC) for fetching instructions from a memory system. The architecture provides a program counter indexed address translation table (PCAT) with rows accessed with a program counter (PC) value and entries in a row identifying a virtual memory address and a corresponding physical memory address. Translation circuitry operates to access the PCAT with the program counter (PC) value of a given instruction to obtain the physical memory address corresponding to the target virtual memory address of the data the given instruction is accessing.

It is thus a feature of at least one embodiment of the invention to store and use virtual address translation information for a relatively small number of static instructions identified by PC values to provide improved speed or energy savings.

The architecture may further include a buffer having at least one entry receiving and storing a given virtual memory address and a given corresponding physical memory address from the PCAT. Here the translation circuitry may further operate to use an entry of the buffer when the target virtual memory address of the data the given instruction is accessing matches the given virtual memory address of the entry in the buffer.

It is thus a feature of at least one embodiment of the invention to leverage previous lookups from the PCAT when successive instructions have temporal locality in the virtual addresses of the data they are accessing.

The architecture may further provide an L1 cache holding an instruction of a program and at least one translation lookaside buffer (TLB) operating to translate a virtual memory address to a corresponding physical memory address. A given instruction in the L1 cache may be associated with a problem indication (one or more bits), and the problem indication may be set upon the occurrence of a TLB miss for the target virtual memory address of the data the given instruction is accessing. In this case, the translation circuitry may further operate to access the PCAT preferentially when the problem indication for a given instruction has a predetermined value.

It is thus a feature of at least one embodiment of the invention to reduce unnecessary accesses to the PCAT guided by access information from earlier accesses.

The PCAT may be a first PCAT (PCAT1) and second PCAT (PCAT2) in a hierarchy wherein a given entry is moved from the PCAT1 to the PCAT2 when a new entry is created in the PCAT1 causing an eviction of the given entry from the PCAT1.

It is thus a feature of at least one embodiment of the invention to provide improved performance by structuring a hierarchical PCAT that can take advantage of different memory speeds and sizes.

The architecture may further include a first L1 cache and a second L2 cache holding instructions of a program in a hierarchy. Here the translation circuitry may operate to move an entry from the PCAT1 to the PCAT2 when the corresponding instruction is evicted from the L1 cache and move an entry from the PCAT2 to the PCAT1 when the corresponding instruction is moved from the L2 cache to the L1 cache.

It is thus a feature of at least one embodiment of the invention to provide a simple replacement mechanism for the PCAT leveraging the mechanism used in a hierarchy of an L1 cache and an L2 cache.

The architecture may further include at least one translation lookaside buffer (TLB) operating to translate a virtual memory address to a corresponding physical memory address. Here the translation circuitry may update the TLB when a physical memory address corresponding to the target virtual memory address of the data the given instruction is accessing is obtained from the PCAT.

It is thus a feature of at least one embodiment of the invention to permit an address translation obtained from the PCAT for a given instruction to also be profitably used by other instructions.

The architecture may operate specifically upon occurrence of a TLB miss to enroll the target virtual memory address and a corresponding physical memory address in an entry of the PCAT.

It is thus a feature of at least one embodiment of the invention to use historical TLB misses as a simple method to identify entries to be created in the PCAT.

An entry in the PCAT may include a useful indication (one or more bits) having a value indicating historical use of the entry in providing a corresponding physical memory address for a virtual memory address. Here the translation circuitry may preferentially evict (or replace) an entry in the PCAT having a relatively lower value of the useful indication of the entry.

It is thus a feature of at least one embodiment of the invention to provide an improved replacement policy for a PCAT based on historical usefulness of an entry.

The architecture may include a TLB hit count value for a given instruction having a given program counter value and tracking a number of times the given instruction is associated with a TLB hit. Here the translation circuitry may enroll a given virtual memory address and a corresponding physical memory address in the PCAT when the TLB hit count value of the given instruction exceeds a predetermined threshold.

It is thus a feature of at least one embodiment of the invention to provide the benefits of the present invention not simply to instructions that are frequently subject to TLB misses, but also for an instruction where the use of the PCAT would provide high value in energy savings or speed.

These particular objects and advantages may apply to only some embodiments falling within the claims and thus do not define the scope of the invention.

DETAILED DESCRIPTION

Figure 1:
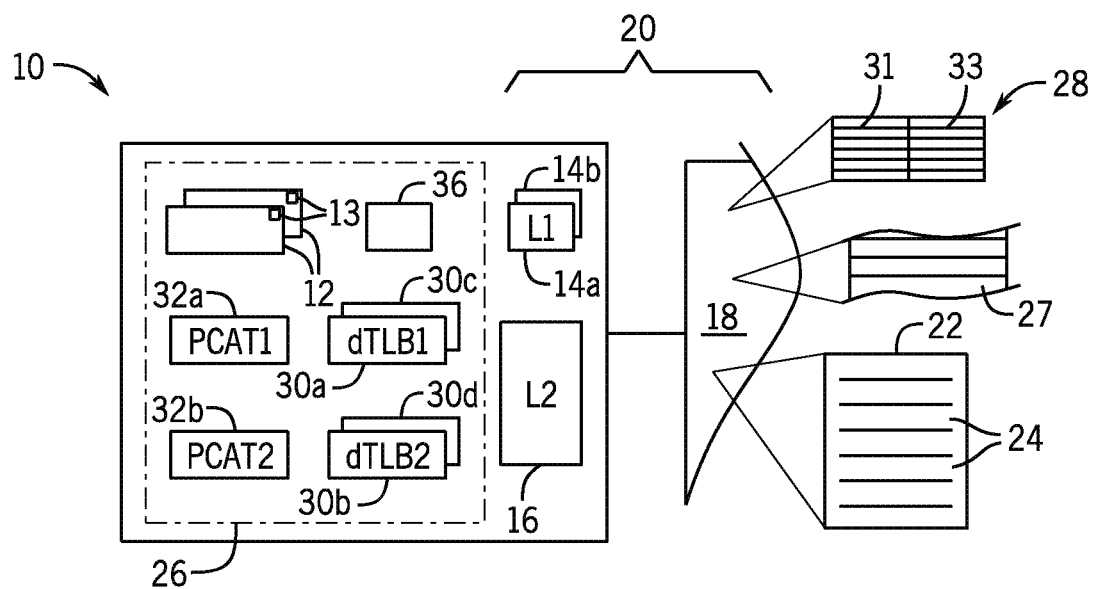
FIG. 1 is an architectural diagram of a computer system employing the present invention and providing address translation circuitry operating with PC-indexed translation tables, TLBs, and a buffer and communicating with memory caches L1 and L2.

Referring now to FIG. 1, in one embodiment, the present invention may provide an architecture 10 providing one or more processors 12 each associated with a program counter (PC) 13, an L1 data cache 14a, an L1 instruction cache 14b, and an L2 cache 16 (in this example, mixed data and instructions) communicating with an external memory 18, for example, including banks of RAM, disk drives, etc. As is understood in the art, the various memory elements of the external memory 18, the L2 cache 16, and the L1 caches 14a and 14b together form a memory system 20 which will hold a program 22 including multiple instructions 24 to be executed by the processor architecture 10 and also the data items operated upon by the program 22. The instructions of a program 22 may include an instruction, identified by a value of a program counter (PC) 13, and operating to access data 27, identified by a data target virtual memory address, from the memory system 20 to be placed in a register of a processor 12.

Generally, the memory system 20 organizes data and instructions according to physical memory addresses whereas the addresses generated during the execution of a program are virtual memory addresses and thus a virtual memory address needs to be translated to a corresponding physical memory address to access information in the memory system 20. As is typical in a computer system employing virtual memory, a virtual memory address, or simply virtual address, is composed of two parts: (i) a virtual page number (VPN) and (ii) an offset within the page, and a physical memory address, or simply physical address, is composed of: (i) a physical page number (PPN) and (ii) an offset within the page. Typically the offset within the page is the same for a virtual memory address and its corresponding physical memory address, and thus the translation of a virtual memory address to a corresponding physical memory address can be accomplished by translating a VPN to a PPN. Accordingly, the architecture 10 may include a page table (PT) 28, an entry in the page table holding a corresponding physical memory address (henceforth also generally referred to as "physical memory address") 33 for a given virtual memory address 31 as will be described further below. In one embodiment the PT 28 may be accessed with the VPN bits of a virtual memory address and the corresponding PT 28 entry holds the PPN bits of the corresponding physical memory address. Entries from the page table 28 will typically be held in the memory system 20.

The architecture 10 may provide an address translation circuit (henceforth also generally referred to as "translation circuit") 26 mediating access between a processor 12 and the memory system 20. The translation circuit 26 will typically operate to translate a given virtual memory address to a corresponding physical memory address by accessing the page table with the given virtual memory address to obtain the corresponding physical memory address. To improve the time and efficiency of the translation process, the translation circuit 26 may further coordinate multiple translation lookaside buffers (TLBs) 30 including, in one embodiment, a first and second data TLB (dTLBs 30a and 30b, respectively) and a first and second instruction TLB (iTLB 30c and 30d, respectively) caching entries of the page table (PT) 28. In one embodiment a second level TLB may be shared between instructions and data. Thus, each of the TLBs 30 provides page table information of a virtual memory address 31 and a physical memory address 33 that may be quickly accessed with respect to a given virtual memory address whose translation to a physical memory address is desired.

For each of the data and instructions, the first and second TLB 30 provide a hierarchical caching system so that if a needed virtual memory address 31 is not found in the first TLB 30, the second TLB 30 may be consulted. If the necessary virtual memory address 31 is not found in either of the first or second TLBs 30, the page table 28 may be accessed, generally a much slower process. Generally, the first TLBs 30 will be smaller and/or more efficient than the second TLBs 30 consistent with the use of such hierarchies.

The translation circuit 26 also coordinates the operation of a first and second program counter (PC) indexed address translation table (PCAT) PCAT1 32a and PCAT2 32b, respectively. The first and second PCATs 32, which will be described in more detail below, may operate in hierarchical fashion. Consistent with this hierarchical use, PCAT1 32a will generally be smaller, faster, or more energy efficient than PCAT2 32b.

The translation circuit 26 may operate to control a small recent PCAT accesses (RPA) buffer 36 sized to hold a small number of entries, an entry in the RPA buffer 36 holding a virtual memory address 31 and corresponding physical memory address 33 as will also be described below.

Figure 2:
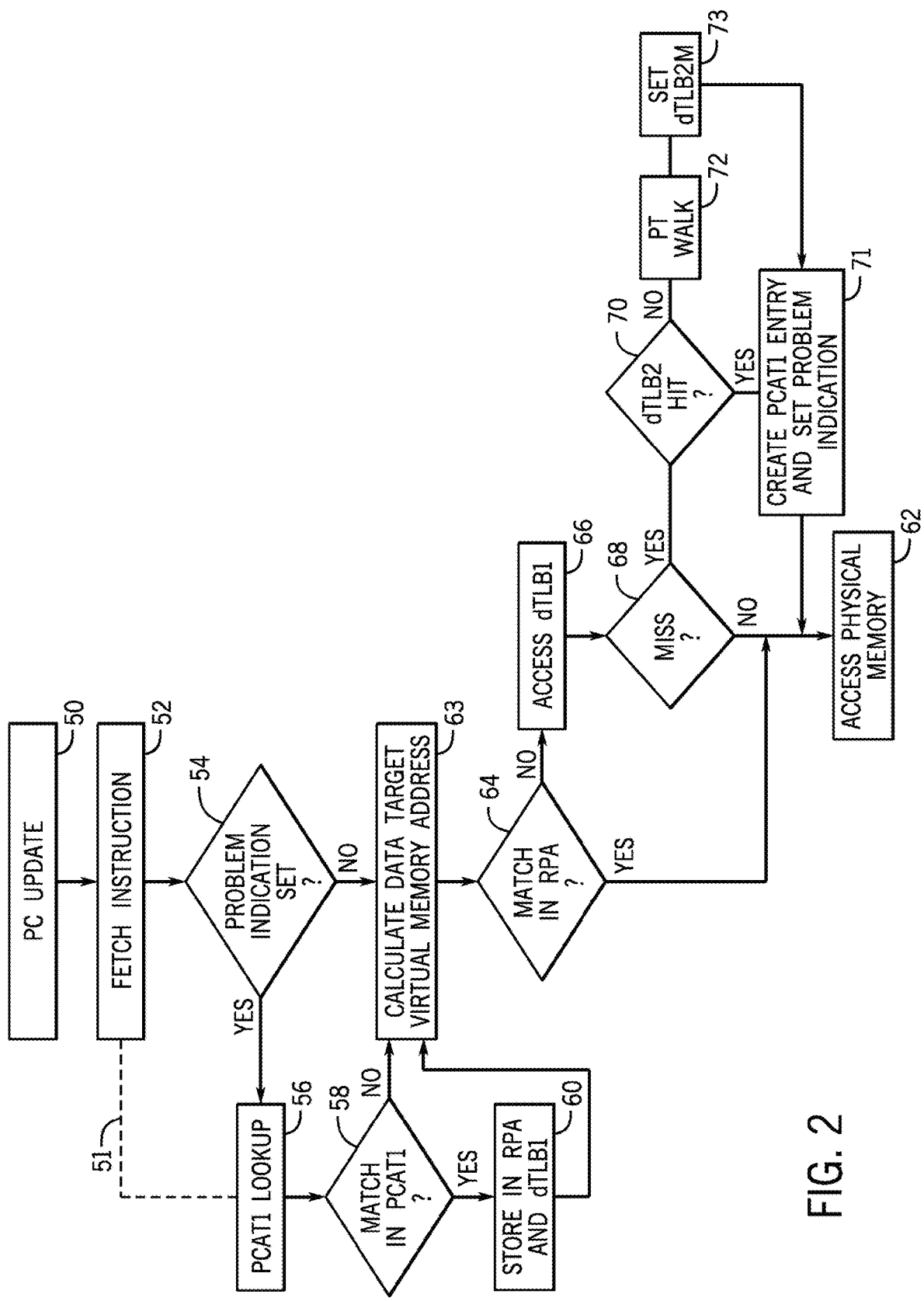
FIG. 2 is a flowchart showing operation of the address translation circuitry of FIG. 1 where solid lines indicate control flow and dotted lines indicate selected data flow.
Figure 3:
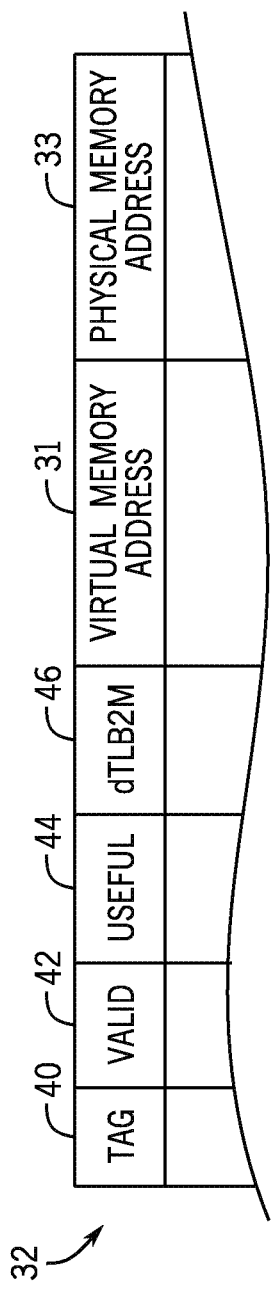
FIG. 3 is a logical representation of a PC-indexed translation table used in the present invention.

Referring to FIG. 3, each of the PCAT1 32a and PCAT2 32b provides data tables with a logical row indexed by a value of a program counter (PC) 13 obtained at process block 50 of FIG. 2, and with a tag 40 that may be derived from a PC value, for example, being a full PC value or a compressed or hashed version of a PC value. The tag 40 may be followed by a valid bit 42, indicating that the entry of the row is valid. The valid bit 42 may be followed by a useful indication 44 and a dTLB2M indication 46 to be described further below.

Importantly a row of the PCAT 32 provides a virtual memory address 31 and its corresponding physical memory address 33 and more generally other information from a corresponding entry of the page table 28. In one embodiment the virtual memory address may be represented by the VPN bits of the virtual memory address and the physical memory address may be represented by the PPN bits of the physical memory address. In another embodiment the virtual memory address may be represented by another subset of the virtual memory address bits and the physical memory address may also be represented by a subset of the physical memory address bits. In another embodiment all the bits of both the virtual memory address and the physical memory address may be used.

Referring now to FIG. 2, the translation circuit 26 operates, as indicated by process block 50, to receive a value of the program counter (PC) 13 from a processor 12 identifying a current instruction to be executed. The operation in FIG. 2 will be described for a load instruction though a similar operation could be used for other instructions that access memory and need a translation of a data virtual memory address to a data physical memory address.

Figure 4:
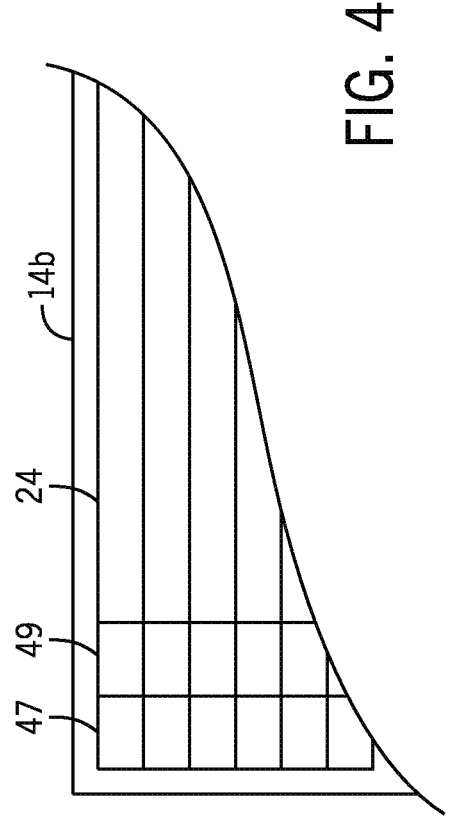
FIG. 4 is a logical representation of an L1 cache augmented with problem indications.

At process block 52, an instruction 24 is fetched, for example, by using the iTLB 30d and possibly the iTLB 30e to convert a virtual instruction memory address of the PC value of the instruction to a physical memory address for access of the L1 instruction cache 14b. Referring momentarily to FIG. 4, the instruction 24 in the L1 instruction cache 14b may be associated with a problem indication 47 optionally provided to indicate whether the instruction is associated with a miss in the dTLB1 30a. In one embodiment the problem indication may be a single bit. The setting of this problem indication 47 will be described further below. Per conventional operation, if an instruction is not found in the L1 instruction cache 14b, the L2 cache 16 is checked and ultimately the main memory 18 is relied upon.

When an instruction 24 fetched at process block 52 is a load instruction or similar memory-data referencing instruction, it will be associated with a target virtual memory address, determined after an address calculation, of the data that the instruction will be accessing, henceforth also generally referred to as "the data of the instruction". In the example of a load instruction, the target virtual memory address identifies the location of the data to be loaded. At decision block 54, if the problem indication 47 associated with the instruction is set, then the PC value obtained at process block 50 is used to access the PCAT1 32a at process block 56 to look for a virtual memory address 31 and a corresponding physical memory address 33, if any, matching that PC value. As noted, the problem indication 47 is optional and is used to avoid unnecessary access to the PCAT1 32a as described below.

If a problem indication 47 is not implemented, then the program branches to process block 56 indicated by path 51.

If a virtual memory address 31 and corresponding physical memory address 33 from the PCAT1 32a are found at decision block 58, they may be stored in a recent PCAT accesses (RPA) buffer 36. The virtual memory address 31 and corresponding physical memory address 33 from the PCAT1 32a may also be stored in the dTLB1 30a. For either the RPA buffer 36 or dTLB1 30a, the storing of a new entry may cause the replacement of an existing entry, using a replacement policy as is known in the art.

As the load instruction is processed, the target virtual memory address of the data to be loaded is computed at process block 63. At decision block 64, the computed target virtual memory address is compared to the virtual memory addresses stored in the RPA buffer 36. If there is a match, then the physical memory address from the PCAT1 32a stored in the matching entry in RPA buffer 36 may be used directly to access physical memory of the memory system 20 per process block 62. In this event, the useful indication 44 of the relevant PCAT1 32a entry may be updated indicating that this entry was useful in providing a physical memory address. Simulations suggest that an RPA buffer 36 having a single entry can meaningfully reduce the number of dTLB accesses and it is contemplated that the RPA buffer 36 may practically be less than 4 entries.

The above matching process is with respect to a virtual memory address stored in the RPA buffer 36, a mechanism that allows a data virtual memory address from a prior lookup of the PCAT1 32a, and present in the RPA buffer 36, to be opportunistically used by a later load instruction which loads data at a target virtual memory address that matches a virtual memory address in the RPA buffer.

Referring again to decision block 54, when a problem indication 47 is not set, after the calculation of the target virtual memory address of the data to be accessed by the instruction, as per process block 63, the translation circuit 26 proceeds to decision block 64 to check for a match in the RPA buffer 36. On a match in the RPA buffer 36, the corresponding physical memory address can be obtained and used to access the memory system 20 as per process block 62. If there is no match in the RPA buffer 36, the translation circuit 26 proceeds to process block 66 to access the dTLB1 30a and possibly dTLB2 30b, with the target virtual memory address of the data. The same path is traversed when process block 56 is invoked but no matching PCAT1 32a entry is found at decision block 58.

Following process block 66, if an entry is found in the dTLB1 30a at decision block 68, then that entry is used to access physical memory of process block 62. In this situation the PCAT1 32a may not be updated.

On the other hand, if there is a dTLB1 miss at decision block 68, the translation circuit 26 proceeds to decision block 70 to interrogate the dTLB2 30b according to normal hierarchical procedures. If there is a hit in the dTLB2 30b at decision block 70, the virtual memory address 31 and physical memory address 33 from an entry in the dTLB2 30b may be used to create an entry in the PCAT1 32a per process block 71 at a row indexed according to the current PC value of the load instruction. This information is then used for access to physical memory per process block 62. At process block 71, the problem indication 47 corresponding to the PC value of the load instruction in the L1 instruction cache 14*b* may also be set.

If at decision block 70 there is a miss in the dTLB2 30*b* then, at process block 72, a page table walk is conducted to obtain the necessary translation pair of a virtual memory address 31 and corresponding physical memory address 33 from the page table. This information is used to create an entry in PCAT1 32*a* as per process block 71. At process block 73 the dTLB2M indication 46 of FIG. 3 may be set indicating that this particular access required a time-consuming page table access. Access to physical memory per process block 62 may then be completed.

Desirably, the PCAT1 may be relatively small to be fast and energy efficient. PCAT1 tables as small as 8 entries and less than 2000 entries are contemplated and have been shown through simulation to provide substantial access benefits with respect to speed, energy, or the like.

When a new entry in the PCAT1 32*a* necessitates the removal of a previous entry, a least recently used replacement (or eviction) policy may be employed. This replacement policy in the PCATs 32 may be augmented by favoring the retention of entries with a relatively higher useful indication 44 and/or with a set dTLB2M indication 46. An entry removed from the PCAT1 32*a* may be moved to PCAT2 32*b*.

Generally entries are created directly in PCAT1 32*a*. An entry may be moved from PCAT1 32*a* to PCAT2 32*b* when the corresponding instruction cache block is evicted from the L1 instruction cache 14*b* or when the entry is evicted from PCAT1 32*a* as part of a replacement process. Thus new entries may be created in the PCAT2 32*b* when a new entry is moved from PCAT1 32*a* to PCAT2 32*b*. An entry may be moved from PCAT2 32*b* to PCAT1 32*a* when the corresponding instruction cache block is moved from the L2 cache 16 to the L1 instruction cache 14*b*. In one embodiment, an entry in the PCAT2 32*b* provides a virtual memory address 31 and its corresponding physical memory address 33 as discussed above. In another embodiment, an entry in the PCAT2 32*b* may simply be a pointer to a dTLB2 30*b* entry, and moving an entry from PCAT 32*b* to PCAT 32*a* may involve reading a virtual memory address 31 and a corresponding physical memory address 33 from the dTLB2 30*b*.

When an entry is made in the PCAT1 32*a*, as a result of a miss in dTLB1 30*a* at decision block 68, or a miss in dTLB2 30*b* at decision block 70, the dTLB1 30*a* or dTLB2 30*b* may optionally be updated, respectively. Likewise when there is a hit in the PCAT1 32*a*, as a result of a match at decision block 58, the dTLB1 30*a* may be optionally updated.

It is contemplated that the PCATs 32 could also be used for a small number of other "high value" instructions that frequently make accesses to and hit in the dTLB1 30*a*. Accordingly, the PCAT may be populated based upon the identification of a high value instruction for which a PCAT1 32*a* may be able to provide the corresponding physical memory address for a target virtual memory address for the data of the instruction faster, and possibly with a lower energy consumption, than a dTLB1 30*a*. Here in one embodiment a first counter may be used to track the number of times a dynamic instance of an instruction identified by a given program counter 13 hits in the dTLB1 30*a*, and also obtains the same address translation from the dTLB1 30*a* as the previous dynamic instance of the instruction. In one embodiment the first counter for an instruction may be maintained in a table of first counters accessed with the bits of the PC 13 of an instruction. In another embodiment, the table may be accessed with a subset or a hashed set of bits of the PC 13 of an instruction, resulting in multiple instructions sharing a counter. In another embodiment, the first counter for a given instruction may be maintained alongside the given instruction 24 in the L1 instruction cache 14*b*, similar to the problem indication 47 in FIG. 3. An instruction may be classified as a high value instruction if the value of the first counter exceeds a threshold. When an instruction is classified as a high value instruction, and a translation request is submitted to the dTLB1 30*a*, and the request hits in the dTLB1 30*a*, the matching entry in the dTLB1 30*a* may be used to create an entry in the PCAT1 32*a* at a row indexed by the value of the PC 13 of the instruction obtained at process block 50. A high-value indication 49 in the L1 instruction cache 14*b* for the instruction may be set. When the high value instruction is encountered again, at decision block 54, the setting of the high-value indication 49 will result in a PCAT1 32*a* lookup as per process block 56.

The problem indication 47 and the high value indication 49 are shown associated with an instruction but may, for reasons of efficiency, be associated with a memory block holding that instruction in the L1 cache. Embodiments using either or both of the problem indication 47 and high-value indication 49 are contemplated.

It should be noted that when a match is found in the PCAT1 32*a* or the RPA buffer 36 it is not necessary to bypass the dTLB1 30*a* to obtain a benefit of improved access speed and accordingly access to the PCAT1 32*a* and RPA buffer 36 and the dTLB1 30*a* may be performed. In situations where improved access speed and lower energy costs are desired, the dTLB1 30*a* may be bypassed or alternatively the dTLB1 30*a* may be accessed but operated, for example, in a lower energy configuration (for example, using a decreased lower clock speed and/or slower and more energy efficient transistors) to obtain those energy savings without bypassing the dTLB1 30*a*.

Periodically an entry in the PCAT1 and or PCAT2, or the entire structures may be invalidated for the purpose of synchronizing other memory structures that track TLB misses or for other purposes.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to circuitry, for example, the translation circuit 26 should be understood to include a variety of implementations including logical state machines, gate arrays, microcode programmed processors and the like.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An architecture of a computer processor providing a program counter (PC) for fetching instructions from a memory system, the memory system holding a given instruction identified by a given program counter (PC) value, the given instruction accessing data at a target virtual memory address; the memory system further holding a page table, an entry in the page table identifying a corresponding physical memory address for a given virtual memory address; the architecture comprising:
   a program counter indexed address translation table (PCAT) having rows accessed with a program counter (PC) value, an entry in a row identifying a virtual memory address and a corresponding physical memory address;
   translation circuitry operating to access the PCAT with the given program counter (PC) value of a given instruction to obtain the physical memory address corresponding to the target virtual memory address of the data the given instruction is accessing.

2. The architecture of claim 1 wherein the architecture further includes a buffer having at least one entry receiving and storing a given virtual memory address and a given corresponding physical memory address from the PCAT in an entry; and
   wherein the translation circuitry further operates to use the given corresponding physical memory address from an entry of the buffer when the target virtual memory address of the data the given instruction is accessing matches the given virtual memory address of the entry in the buffer.

3. The architecture of claim 1 further having an L1 cache holding a given instruction of a program and at least one translation lookaside buffer (TLB) operating to translate a virtual memory address to a corresponding physical memory address, a TLB miss occurring when a desired translation from a virtual memory address to a corresponding physical memory address is not found in the TLB; and
   wherein a given instruction in the L1 cache is associated with a problem indication, and wherein the problem indication for a given instruction is set by the translation circuitry on the occurrence of a TLB miss for the target virtual memory address of the data the given instruction is accessing; and
   wherein the translation circuitry further operates to access the PCAT preferentially when the problem indication for a given instruction has a predetermined value.

4. The architecture of claim 1 wherein the PCAT includes a first PCAT (PCAT1) and second PCAT (PCAT2) in a hierarchy wherein a given entry is moved from the PCAT1 to the PCAT2 when a new entry is created in the PCAT1 causing an eviction of the given entry from the PCAT1.

5. The architecture of claim 4 further having a first L1 cache and a second L2 cache holding instructions of a program in a hierarchy wherein a miss in the L1 cache causes an eviction of a first instruction from the L1 cache and a movement of a second instruction from the L2 cache to the L1 cache; and
   wherein the translation circuitry further operates to move a first entry from the PCAT1 to the PCAT2 when the corresponding first instruction is evicted from the L1 cache, and move a second entry from the PCAT2 to the PCAT1 when the corresponding second instruction is moved from the L2 cache to the L1 cache.

6. The architecture of claim 4 wherein an entry in the PCAT includes a useful indication having a value indicating historical use of the entry in providing a corresponding physical memory address for a virtual memory address; and
   wherein the translation circuitry further operates to preferentially evict an entry in the PCAT having a relatively lower value of the useful indication of the entry.

7. The architecture of claim 4 wherein the architecture further includes a first data translation lookaside buffer (dTLB1) and a second data translation lookaside buffer (dTLB2) both operating to translate a virtual memory address to a corresponding physical memory address, a dTLB1 miss occurring when a desired translation from a virtual memory address to a corresponding physical memory address is not found in the dTLB1 and a dTLB2 miss occurring when a desired translation from a virtual memory address to a corresponding physical memory address is not found in the dTLB2 and where a miss in the dTLB1 causes a search in the dTLB2 and a miss in the dTLB2 causes a search in the page table; and
   wherein an entry in the PCAT includes a dTLB2 miss indication (dTLBM) having a value indicating a previous miss in the dTLB2 for the virtual memory address of the entry in the PCAT; and
   wherein the translation circuitry further operates to preferentially evict an entry in the PCAT not having a set dTLB2 miss indication.

8. The architecture of claim 1, wherein the architecture further includes at least one translation lookaside buffer (TLB) operating to translate a virtual memory address to a corresponding physical memory address, a TLB miss occurring when a desired translation from a virtual memory address to a corresponding physical memory address is not found in the TLB; and
   wherein the translation circuitry updates the TLB when a physical memory address corresponding to the target virtual memory address of the data a given instruction is accessing is obtained from the PCAT.

9. The architecture of claim 1 wherein the architecture further includes at least one translation lookaside buffer (TLB) operating to translate a virtual memory address to a corresponding physical memory address, a TLB miss occurring when a desired translation from a virtual memory address to a corresponding physical memory address is not found in the TLB; and
   wherein the translation circuitry further operates upon an occurrence of a TLB miss for the target virtual memory address of the data the given instruction is accessing to enroll the target virtual memory address and a corresponding physical memory address in an entry of the PCAT at a row corresponding to the program counter value of the given instruction.

10. The architecture of claim 1 wherein the architecture further includes at least one translation lookaside buffer (TLB) operating to translate a virtual memory address to a corresponding physical memory address, a TLB hit occurring when a desired translation from a virtual memory address to a corresponding physical memory address is found in the TLB; and wherein the translation circuitry maintains a TLB hit count value for a given instruction having a given program counter value, the TLB hit count value tracking a number of times the given instruction is associated with a TLB hit; and wherein the translation circuitry further operates to enroll a given virtual memory address and a corresponding physical memory address associated with the given instruction as an entry in the PCAT at a row corresponding to the given program counter value of the given instruction when the TLB hit count value of the given instruction exceeds a predetermined threshold.

11. A method of operating a computer architecture having a computer processor providing a program counter (PC) for fetching instructions from a memory system, the memory system holding a given instruction identified by a given program counter (PC) value, the given instruction accessing data at a target virtual memory address; the memory system further holding a page table, an entry in the page table identifying a corresponding physical memory address for a given virtual memory address; the architecture further including a program counter indexed address translation table (PCAT) having rows accessed with a program counter (PC) value, an entry in a row identifying a virtual memory address and a corresponding physical memory address; the method comprising:

receiving a given instruction associated with a given program counter (PC) value;

obtaining a physical memory address corresponding to a target virtual memory address of the data the given instruction is accessing by accessing the PCAT with the given program counter (PC) value of a given instruction.

12. The method of claim 11 wherein the architecture further includes a buffer having at least one entry receiving and storing a given virtual memory address and a given corresponding physical memory address from the PCAT in an entry; and further including the step of: obtaining the physical memory address of the data a given instruction is accessing by using the given corresponding physical memory address from an entry of the buffer when the target virtual memory address of the data the given instruction is accessing matches the given virtual memory address of the entry in the buffer.

13. The method of claim 11 wherein the architecture further includes an L1 cache holding a given instruction of a program and at least one translation lookaside buffer (TLB) operating to translate a virtual memory address to a corresponding physical memory address, a TLB miss occurring when a desired translation from a virtual memory address to a corresponding physical memory address is not found in the TLB; and wherein a given instruction in the L1 cache is associated with a problem indication, and further including:

setting the problem indication for a given instruction on the occurrence of a TLB miss for the target virtual memory address of the data the given instruction is accessing; and accessing the PCAT preferentially when the problem indication for a given instruction has a predetermined value.

14. The method of claim 13 wherein the PCAT includes a first PCAT (PCAT1) and second PCAT (PCAT2) in a hierarchy wherein a given entry is moved from the PCAT1 to the PCAT2 when a new entry is created in the PCAT1 causing an eviction of the given entry from the PCAT1.

15. The method of claim 14 wherein the architecture further includes a first L1 cache and a second L2 cache holding instructions of a program in a hierarchy wherein a miss in the L1 cache causes an eviction of a first instruction from the L1 cache and a movement of a second instruction from the L2 cache to the L1 cache; and including:

moving a first entry from the PCAT1 to the PCAT2 when the corresponding first instruction is evicted from the L1 cache, and move a second entry from the PCAT2 to the PCAT1 when the corresponding second instruction is moved from the L2 cache to the L1 cache.

16. The method of claim 14 wherein an entry in the PCAT includes a useful indication having a value indicating historical use of the entry in providing a corresponding physical memory address for a virtual memory address; and further including:

preferentially evicting an entry in the PCAT having a relatively lower value of the useful indication of the entry.

17. The method of claim 14 wherein the architecture further includes a first data translation lookaside buffer (dTLB1) and a second data translation lookaside buffer (dTLB2) both operating to translate a virtual memory address to a corresponding physical memory address, a dTLB1 miss occurring when a desired translation from a virtual memory address to a corresponding physical memory address is not found in the dTLB1 and a dTLB2 miss occurring when a desired translation from a virtual memory address to a corresponding physical memory address is not found in the dTLB2 and where a miss in the dTLB1 causes a search in the dTLB2 and a miss in the dTLB2 causes a search in the page table; and wherein an entry in the PCAT includes dTLB2 miss indication (dTLBM) having a value indicating a previous miss in the dTLB2 for the virtual memory address of the entry in the PCAT; and further including:

preferentially evicting an entry in the PCAT not having a set dTLB2 miss indication.

18. The method of claim 11, wherein the architecture further includes at least one translation lookaside buffer (TLB) operating to translate a virtual memory address to a corresponding physical memory address, a TLB miss occurring when a desired translation from a virtual memory address to a corresponding physical memory address is not found in the TLB; and further including:

updating the TLB when a physical memory address corresponding to the target virtual memory address of the data a given instruction is accessing is obtained from the PCAT.

19. The method of claim 11 wherein the architecture further includes at least one translation lookaside buffer (TLB) operating to translate a virtual memory address to a corresponding physical memory address, a TLB miss occurring when a desired translation from a virtual memory address to a corresponding physical memory address is not found in the TLB; and further including:

upon an occurrence of a TLB miss for the target virtual memory address of the data the given instruction is accessing, enrolling the target virtual memory address and a corresponding physical memory address in an entry of the PCAT at a row corresponding to the program counter value of the given instruction.

20. The method of claim 11 wherein the architecture further includes at least one translation lookaside buffer (TLB) operating to translate a virtual memory address to a corresponding physical memory address, a TLB hit occurring when a desired translation from a virtual memory address to a corresponding physical memory address is found in the TLB; and further including:

maintaining a TLB hit count value for a given instruction having a given program counter value, the TLB hit count value tracking a number of times the given instruction is associated with a TLB hit; and enrolling a given virtual memory address and a corresponding physical memory address associated with the given instruction as an entry in the PCAT at a row corresponding to the given program counter value of the given instruction when the TLB hit count value of the given instruction exceeds a predetermined threshold.

* * * * *